US007392471B1

(12) United States Patent
Ford et al.

(10) Patent No.: US 7,392,471 B1
(45) Date of Patent: Jun. 24, 2008

(54) SYSTEM AND METHOD FOR COMPARING EXTENSIBLE MARKUP LANGUAGE (XML) DOCUMENTS

(75) Inventors: Peter Ford, Elmont, NY (US); Kei Downey, Forest Hills, NY (US)

(73) Assignee: JP Morgan Chase Bank, New York, NY (US)

( * ) Notice: Subject to any disclaimer, the term of this patent is extended or adjusted under 35 U.S.C. 154(b) by 288 days.

(21) Appl. No.: 11/053,481

(22) Filed: Feb. 8, 2005

Related U.S. Application Data

(60) Provisional application No. 60/591,647, filed on Jul. 28, 2004.

(51) Int. Cl.
*G06F 17/00* (2006.01)
(52) U.S. Cl. ........................................ 715/234; 715/229
(58) Field of Classification Search .................. 715/513, 715/530, 531, 234, 229, 255, 256
See application file for complete search history.

(56) References Cited

U.S. PATENT DOCUMENTS

| | | | |
|---|---|---|---|
| 4,751,702 A | 6/1988 | Beier et al. |
| 5,027,269 A | 6/1991 | Grant et al. |
| 5,301,320 A | 4/1994 | McAtee et al. |
| 5,325,527 A | 6/1994 | Cwikowski et al. |
| 5,499,371 A | 3/1996 | Henninger et al. |
| 5,539,885 A | 7/1996 | Ono et al. |
| 5,553,235 A | 9/1996 | Chen et al. |
| 5,566,297 A | 10/1996 | Devarakonda |
| 5,594,863 A | 1/1997 | Stiles |
| 5,630,047 A | 5/1997 | Wang |
| 5,630,173 A | 5/1997 | Oprescu |
| 5,673,403 A | 9/1997 | Brown et al. |
| 5,689,698 A | 11/1997 | Jones et al. |
| 5,692,181 A | 11/1997 | Anand et al. |
| 5,712,971 A | 1/1998 | Stanfill et al. |
| 5,717,925 A | 2/1998 | Harper et al. |
| 5,732,262 A | 3/1998 | Gillespie et al. |
| 5,734,887 A | 3/1998 | Kingberg et al. |

(Continued)

FOREIGN PATENT DOCUMENTS

WO 01/35209 5/2001

(Continued)

OTHER PUBLICATIONS

"DOMMITT Diff and Merge utility for XML" Archived Mar. 10, 2002 http://www,dommitt.com/v1.1pages/storx.htm.*

(Continued)

*Primary Examiner*—Stephen Hong
*Assistant Examiner*—Adam M Queler
(74) *Attorney, Agent, or Firm*—Lowenstein Sandler PC

(57) ABSTRACT

A system and a method for comparing Extensible Markup Language (XML) documents includes providing two XML documents as XML objects to a comparison tool and providing a list of XML items to be either included or excluded from the comparison. The comparison tool provides an application program interface (API), which allows it to be plugged into any application. The adaptability of the comparison tool to any application and the ability to exclude items from the comparison, or limit the comparison to specific items, provide for a flexible tool that improves performance for a user.

16 Claims, 7 Drawing Sheets

U.S. PATENT DOCUMENTS

| | | | |
|---|---|---|---|
| 5,737,592 A | 4/1998 | Nguyen et al. |
| 5,761,499 A | 6/1998 | Sonderegger |
| 5,768,119 A | 6/1998 | Havekost et al. |
| 5,784,557 A | 7/1998 | Oprescu |
| 5,790,809 A | 8/1998 | Holmes |
| 5,801,689 A | 9/1998 | Huntsman |
| 5,802,367 A | 9/1998 | Held et al. |
| 5,806,075 A | 9/1998 | Jain et al. |
| 5,815,415 A | 9/1998 | Bentley et al. |
| 5,845,292 A | 12/1998 | Bohannon et al. |
| 5,889,992 A | 3/1999 | Koerber |
| 5,899,990 A | 5/1999 | Maritzen et al. |
| 5,926,637 A | 7/1999 | Cline et al. |
| 5,930,768 A | 7/1999 | Hooban |
| 5,937,198 A | 8/1999 | Nelson et al. |
| 5,937,402 A | 8/1999 | Pandit |
| 5,946,458 A | 8/1999 | Austin et al. |
| 5,949,412 A | 9/1999 | Huntsman |
| 5,960,200 A | 9/1999 | Eager et al. |
| 5,960,445 A | 9/1999 | Tamori et al. |
| 5,987,247 A | 11/1999 | Lau |
| 5,999,179 A | 12/1999 | Kekic et al. |
| 6,003,075 A | 12/1999 | Arendt et al. |
| 6,009,274 A | 12/1999 | Fletcher et al. |
| 6,009,405 A | 12/1999 | Leymann et al. |
| 6,011,916 A | 1/2000 | Moore et al. |
| 6,046,742 A | 4/2000 | Chari |
| 6,052,456 A | 4/2000 | Huang |
| 6,065,009 A | 5/2000 | Leymann et al. |
| 6,083,276 A | 7/2000 | Davidson et al. |
| 6,101,489 A | 8/2000 | Lannert et al. |
| 6,101,601 A | 8/2000 | Matthews et al. |
| 6,108,698 A | 8/2000 | Tenev et al. |
| 6,148,296 A | 11/2000 | Tabbara |
| 6,163,776 A | 12/2000 | Periwal |
| 6,173,439 B1 | 1/2001 | Carlson et al. |
| 6,178,409 B1 | 1/2001 | Weber et al. |
| 6,184,996 B1 | 2/2001 | Gase |
| 6,185,613 B1 | 2/2001 | Lawson et al. |
| 6,195,676 B1 | 2/2001 | Spix et al. |
| 6,226,684 B1 | 5/2001 | Sung et al. |
| 6,230,319 B1 | 5/2001 | Britt, Jr. et al. |
| 6,246,410 B1 | 6/2001 | Bergeron et al. |
| 6,249,877 B1 | 6/2001 | Kawakami et al. |
| 6,253,193 B1 | 6/2001 | Ginter et al. |
| 6,272,556 B1 | 8/2001 | Gish |
| 6,282,698 B1 | 8/2001 | Baker et al. |
| 6,288,790 B1 | 9/2001 | Yellepeddy et al. |
| 6,289,336 B1 | 9/2001 | Melton et al. |
| 6,292,933 B1 | 9/2001 | Bahrs et al. |
| 6,298,353 B1 | 10/2001 | Apte |
| 6,304,871 B1 | 10/2001 | Gajda et al. |
| 6,314,430 B1 | 11/2001 | Chang |
| 6,317,738 B1 | 11/2001 | Lohman et al. |
| 6,324,525 B1 | 11/2001 | Kramer et al. |
| 6,324,619 B1 | 11/2001 | Raverdy et al. |
| 6,332,161 B1 | 12/2001 | Sasson |
| 6,353,820 B1 | 3/2002 | Edwards et al. |
| 6,363,363 B1 | 3/2002 | Haller et al. |
| 6,363,499 B1 | 3/2002 | Delo et al. |
| 6,381,609 B1 | 4/2002 | Breitbart et al. |
| 6,430,556 B1 | 8/2002 | Goldberg et al. |
| 6,438,749 B1 | 8/2002 | Chamberlain |
| 6,442,533 B1 | 8/2002 | Hinkle |
| 6,442,748 B1 | 8/2002 | Bowman-Amuah |
| 6,453,127 B2 | 9/2002 | Wood et al. |
| 6,463,343 B1 | 10/2002 | Emens et al. |
| 6,463,439 B1 | 10/2002 | Dahlberg |
| 6,467,079 B1 | 10/2002 | Ettritch et al. |
| 6,470,384 B1 | 10/2002 | O'Brian et al. |
| 6,473,786 B1 | 10/2002 | Scouras et al. |
| 6,477,580 B1 | 11/2002 | Bowman-Amuah |
| 6,477,590 B1 | 11/2002 | Habusha et al. |
| 6,480,860 B1 | 11/2002 | Monday |
| 6,480,894 B1 | 11/2002 | Courts et al. |
| 6,484,310 B1 | 11/2002 | Przybylski et al. |
| 6,502,095 B2 | 12/2002 | Breitbart et al. |
| 6,502,207 B1 | 12/2002 | Itoh et al. |
| 6,505,238 B1 | 1/2003 | Tran |
| 6,510,352 B1 | 1/2003 | Badavas et al. |
| 6,518,983 B1 | 2/2003 | Grohmann et al. |
| 6,526,571 B1 | 2/2003 | Aizikowitz et al. |
| 6,539,337 B1 | 3/2003 | Provan et al. |
| 6,546,419 B1 | 4/2003 | Humpleman et al. |
| 6,553,428 B1 | 4/2003 | Ruehle et al. |
| 6,557,039 B1 | 4/2003 | Leong et al. |
| 6,571,282 B1 | 5/2003 | Bowman-Amuah |
| 6,571,389 B1 | 5/2003 | Spyker et al. |
| 6,578,068 B1 | 6/2003 | Bowman-Amuah |
| 6,584,497 B1 | 6/2003 | Case et al. |
| 6,590,587 B1 | 7/2003 | Wichelman et al. |
| 6,615,258 B1 | 9/2003 | Barry et al. |
| 6,643,679 B1 | 11/2003 | Erickson et al. |
| 6,654,784 B1 | 11/2003 | Wei |
| 6,657,625 B1 | 12/2003 | Chik et al. |
| 6,675,228 B1 | 1/2004 | Bahrs et al. |
| 6,725,231 B2 | 4/2004 | Hu et al. |
| 6,848,078 B1 * | 1/2005 | Birsan et al. ............... 715/511 |
| 6,928,488 B1 | 8/2005 | de Jong et al. |
| 2001/0020255 A1 | 9/2001 | Hofmann et al. |
| 2001/0029604 A1 | 10/2001 | Dreyband et al. |
| 2002/0010867 A1 | 1/2002 | Schaefer et al. |
| 2002/0046239 A1 | 4/2002 | Stawikowski et al. |
| 2002/0055804 A1 | 5/2002 | Betawar et al. |
| 2002/0062475 A1 | 5/2002 | Iborra et al. |
| 2002/0065814 A1 | 5/2002 | Okamoto et al. |
| 2002/0069156 A1 | 6/2002 | Adam et al. |
| 2002/0069192 A1 | 6/2002 | Aegerter |
| 2002/0078115 A1 | 6/2002 | Poff et al. |
| 2002/0103725 A1 | 8/2002 | Martin et al. |
| 2002/0103835 A1 | 8/2002 | Kearney |
| 2002/0109718 A1 | 8/2002 | Mansour et al. |
| 2002/0111995 A1 | 8/2002 | Mansour et al. |
| 2002/0111999 A1 | 8/2002 | Andersson |
| 2002/0116205 A1 | 8/2002 | Ankireddipally et al. |
| 2002/0120685 A1 | 8/2002 | Srivastava et al. |
| 2002/0124113 A1 | 9/2002 | Gargya et al. |
| 2002/0129096 A1 | 9/2002 | Mansour et al. |
| 2002/0133579 A1 | 9/2002 | Bernhardt et al. |
| 2002/0143721 A1 | 10/2002 | Charlet et al. |
| 2002/0143819 A1 | 10/2002 | Han et al. |
| 2002/0144101 A1 | 10/2002 | Wang et al. |
| 2002/0147857 A1 | 10/2002 | Sanchez, II et al. |
| 2002/0178191 A1 | 11/2002 | Sielken |
| 2002/0178434 A1 | 11/2002 | Fox et al. |
| 2002/0188765 A1 | 12/2002 | Fong et al. |
| 2002/0188928 A1 | 12/2002 | Szpak et al. |
| 2003/0009323 A1 | 1/2003 | Adeli |
| 2003/0028555 A1 | 2/2003 | Young et al. |
| 2003/0033121 A1 | 2/2003 | Chen et al. |
| 2003/0033159 A1 | 2/2003 | Altomare |
| 2003/0036809 A1 | 2/2003 | Landman et al. |
| 2003/0046317 A1 | 3/2003 | Cseri et al. |
| 2003/0050897 A1 | 3/2003 | Altomare |
| 2003/0069907 A1 | 4/2003 | Moreau et al. |
| 2003/0084067 A1 | 5/2003 | Obiaya |
| 2003/0093574 A1 | 5/2003 | Fablet et al. |
| 2003/0097383 A1 | 5/2003 | Smirnov et al. |
| 2003/0160813 A1 | 8/2003 | Raju |
| 2003/0217033 A1 | 11/2003 | Sandler et al. |
| 2003/0237047 A1 * | 12/2003 | Borson ............... 715/513 |
| 2004/0107183 A1 | 6/2004 | Mangan |
| 2004/0230587 A1 | 11/2004 | Doddington |
| 2005/0030555 A1 | 2/2005 | Phenix et al. |

| | | | | |
|---|---|---|---|---|
| 2006/0129523 | A1* | 6/2006 | Roman et al. | 707/1 |
| 2006/0130047 | A1* | 6/2006 | Burugapalli | 717/170 |
| 2006/0168510 | A1* | 7/2006 | Bryar et al. | 715/511 |

FOREIGN PATENT DOCUMENTS

| | | |
|---|---|---|
| WO | 01/63529 | 8/2001 |
| WO | 02/46916 | 6/2002 |
| WO | 02/046980 | 6/2002 |
| WO | 03/001373 | 1/2003 |

OTHER PUBLICATIONS

"Options to diff", FreeBSD Info Files, (C) 1997 FreeBSD http://docs.freebsd.org/info/diff/diff.info.diff_Options.html.*

Orenstein, David, QuickStudy: Application Programming Interface (API), Jan. 10, 2000, ComputerWorld Development, http://www.computerworld.com/action/article.do?command=printArticleBasic&articleId=43487.*

Thomas; Enterprise Javabeans(TM) Technology: Server Component Model for the Java(TM) Platform, java.sun.com, May 2, 1999.

Rennhackkamp; One for the Road: Sybase/ES Adaptive Server Anywhere 6.0, M&T Publishing Inc., Section No. 10, vol. 11, p. 55, ISSN. 1041-5173.

McClanahan; Powerbuilder3.0 M&T Publishing Inc., vol. 6, No. 11, p. 57, ISSN. 1041-5173, Oct. 1993.

Unknown; Conjuring Up Com Through Scripting, p. 14, Jul. 2000.

Quantum SPC/DC Script File (·TDF) Definition Instruction Guide, ASI Data Myte Inc., Version 2.4, p. 2-14.

Myers; Scripting Graphical Applications by Demonstration, Human Computer Interaction Institute, Carnegie Mellon University, www.cs.cmu.edu/bam, p. 1-8, Apr. 1998.

Ousterhout; Scripting Higher Level Programming for the 21st Century, Sun Microsystems Laboratories, Draft #2, p. 1-14, May 10, 1997.

Dolev, et al.; An Integrated Architecture for the Scalable Delivery of Semi-Dynamic Web Content; Proceedings of the Seventh International Symposium on Computers and Communications, IEEE, 2002.

Betwixt: Turning Beans Into XML, Apache Software Foundation, Archived Jun. 20, 2002 at <http://web.archive.org/web/20020620000410/http://jakarta.apahce.org.commons/betwixt/>, p. 1 of 1, Nov. 13, 2005.

XML Schema Part 0 Primer-W3C Working Draft, W3C, Feb. 2000, Retrieved from the Internet on Nov. 18, 2005 at <http://www.w3.org/TR/2000/WD-Xmlschema-0-20000225/>, 42 pages.

Frank M. Carrano, et al.; Frank M. Carrano, et al., Data Abstraction and Problem Solving With C++, Aug. 1998, Addison-Wesley, Chapter 2.

Brodkin; Brodkin, Use XML Data Binding to Do Your Laundry, Retrieved From the Internet on May 19, 2006, Acessed and Printed From the Internet on May 19, 2006 at http://www.javaworld.com/javaworld/JW-12-2001/JW-1228.jaxb.html.

* cited by examiner

XML Object

```
<?xml version="1.0" encoding="UTF-8" ?>
- <batch version="2.2">
    -   <cds-trade type="trade">
            <primary-id type="m3"> 558650 </primary-id>
            <alt-id type="internal">60170</alt-id>
            <is-what-if>false</is-what-if>
            <is-vanilla>false</is-vanilla>
    -   </cds-trade>
    -   <status>matured</status>
</batch>
```

- 305 — <primary-id type="m3"> 558650 </primary-id>
- 306 — <alt-id type="internal">60170</alt-id>
- 307 — <is-what-if>false</is-what-if>
- 308 — <is-vanilla>false</is-vanilla>
- 309 — <status>matured</status>

303, 304

302

XML Object

```
<?xml version="1.0" encoding="UTF-8" ?>
- <batch version="2.3">
    -   <cds-trade type="trade">
            <primary-id type="m3">550789</primary-id>
            <alt-id type="internal">52583</alt-id>
            <is-what-if>false</is-what-if>
            <is-vanilla>true</is-vanilla>
    -   </cds-trade>
    -   <version>2.0</version>
</batch>
```

- 312 — <primary-id type="m3">550789</primary-id>
- 313 — <alt-id type="internal">52583</alt-id>
- 314 — <is-what-if>false</is-what-if>
- 315 — <is-vanilla>true</is-vanilla>
- 316 — <version>2.0</version>

Result XML Object

```
<?xml version="1.0" encoding="UTF-8"?>
- <batch diff:operation="modified" version-unchanged="2.2">
  - <cds-trade diff:operation="modified" type-unchanged="trade">
      <primary-id diff: operation="modified" type-unchanged="m3">
        <diff:old>550789</diff:old>
        <diff:new>558650</diff:new>
      </primary-id>
      <alt-id diff:operation="unchanged" type-unchanged="m3">60170</alt-id>
      <is-what-if diff:operation="unchanged">false</is-what-if>
      <is-vanilla diff:operation="unchanged">false</is-vanilla>
    </cds-trade>
  - <version diff:operation="deleted">2.0</version>
  - <status diff:operation="inserted">matured</status>
  </batch>
```

701 — (entire block)
702 — cds-trade block
703 — primary-id diff old/new
704 — alt-id
705 — is-what-if
706 — is-vanilla
707 — version
708 — status

SYSTEM AND METHOD FOR COMPARING EXTENSIBLE MARKUP LANGUAGE (XML) DOCUMENTS

CROSS REFERENCE TO RELATED APPLICATIONS

This application claims benefit of Provisional Application No. 60/591,647, filed Jul. 28, 2004, the entire disclosure of which is incorporated herein by reference.

BACKGROUND OF THE INVENTION

1. Field of the Invention

The present invention relates generally to document management and, more particularly, to a system and a method for comparing extensible markup language (XML) documents such that certain elements and attributes are excluded from the comparison process.

2. Related Art

It is common when generating a document, such as a text file or spreadsheet, to draft, review, and revise the document multiple times before a final document is produced. In the electronic age, multiple drafts and revisions of a document may be saved as different versions on a computer or network in order to capture content changes and modifications made between drafts. Often, one may wish to compare versions of a document to determine what changes have been made. For example, if a document is being prepared by more than one person, changes made between versions may not be known to each person preparing the document. Software application comparison tools have been created to provide an easy mechanism for comparing documents and/or versions of a document to highlight changes made.

Current document comparison tools typically are file based, such that the tool or software component takes two flat, or text files, and compares the two files against each other. A common result of such a comparison tool may be a merged result of the two documents, with modifications denoted in a particular manner, such as, for example, deleted content may be struck through while added content may be underlined.

Shortcomings of such comparison tools include a limitation to a specific application or to a specific type of document, and the inability to limit the comparison process to specific content within the documents. Often, certain portions of a document are irrelevant for comparison purposes. For example, when versions of a document are compared, the comparison may yield different version numbers and timestamps, even though such differences may not be relevant to a user generating the comparison. On the other hand, a user may wish to know whether a change has been made in only a specific portion of a document, making any modifications occurring in the rest of the document irrelevant. No current comparison tool allows for a user to be selective in determining specific content for a comparison process.

Additionally, as stated above, most, if not all, tools are file-based executable programs, which generally are limited to a specific application or document type. Thus, a need exists for a comparison tool that may be flexibly used between different applications and document types, and that provides for a selective comparison between documents.

SUMMARY OF INVENTION

The present invention relates to a system and a method for performing a comparison between documents utilizing a list of data items to be excluded from the comparison process. Specifically, the system uses extensible markup language (XML) documents to represent documents or files to be compared, and further uses a hierarchical structure known as a "tree" structure to represent the actual content for the comparison process.

The system of the present invention includes a comparison tool created in an object-oriented programming language (OOPL), such as, for example, JAVA™. The comparison tool provides an application program interface (API) that allows the comparison tool to interact with, or be plugged into, any application capable of interacting with such a language. This allows the comparison tool to be utilized by multiple applications without having to be specialized for each application, thereby increasing the flexibility of the comparison tool of the system. A preferred embodiment of the present invention is disclosed below in which JAVA is used. However, one of ordinary skill will recognize that the present invention is not limited to the use of JAVA and, instead, may use any object oriented programming language.

The comparison tool of the system compares two XML documents, which have been formatted into an XML object representation (XML object), such as the Document Object Model (DOM) established by the World Wide Web Consortium, in order for the comparison tool to manipulate the XML documents. Unlike conventional XML comparison tools, which are limited to performing a straight comparison between XML documents, the comparison tool of the system also incorporates a third XML object representing a list of items from the XML documents to be excluded from the comparison (exclusion list). The comparison tool generates a merged Result XML object, including the items specified in the exclusion list. The Result XML object then may be manipulated according to the needs of a user Alternatively, the third XML object may represent a list of items from the XML documents such that the comparison process is limited only to those specific items. This is beneficial when many changes have occurred between versions of a large document or file, but the relevant portions of the document are few.

In an XML object, an XML document is represented as a logical "tree" having objects, or "nodes," located in a hierarchical branching structure. This tree structure is made up of elements and attributes, where an element represents an actual item in the hierarchy of the document and may have a data value, and an attribute represents data that describes an element. Each node may contain one or more elements and one or more attributes, depending on how the tree diagram is structured. The top node or the "root" node is also referred to as the parent node, with each node descending from it referred to as a child node. Using XML, a document transformed into an XML object may be utilized and manipulated outside of its specific application.

According to another embodiment of the present invention, a method for comparing XML documents includes the steps of the system receiving two XML objects, which represent two XML documents, from one or more sources, and the system receiving a third XML object representing a list of items, divided into elements and/or attributes, to be excluded from a comparison process. The system performs the comparison process between the two XML objects, which represent the two XML documents, by traversing the nodes of the first received XML object and then traversing the nodes of the second received XML object to determine whether elements and attributes have been modified, inserted, and/or deleted between corresponding nodes. The system also determines whether elements and/or attributes have been added and/ deleted between the two XML objects. Elements and attributes identified in the third XML object, the exclusion list, are ignored regardless of whether changes have occurred to them.

Changes are indicated in the node containing the changed element or attribute. Notification of a change in a child node is made in each parent node along the path to the modified child node, up to the root node, which is annotated or notified that a change has occurred in one or more child nodes descending therefrom. This allows an application to determine initially that a change has occurred somewhere in the document without having to locate the specific details. For a user who simply wants to know whether any changes have occurred between two documents, this method provides a quick and simple response to such an inquiry.

The method further includes the step of the system generating a processed result as a Result XML object by merging the two received XML objects and annotating nodes where changes have occurred. The system also passes through to the Result XML object the listed elements and attributes excluded from the comparison process so that no data is left out of the processed result. The excluded elements and attributes appear in the Result XML object as unchanged. In another step of the method, the system transmits the Result XML object in accordance with an application interacting with the system. Because the processed result is generated as an XML object, and not a text file, any application capable of manipulating XML objects may receive and utilize the processed result in accordance with a user's needs.

Advantageously, the system may offer a user the choice of either a straight comparison of two XML documents or a comparison involving an exclusion or inclusion list. Providing both methods for comparing XML documents increases the utility of the system.

The features of providing an exclusion list of XML items and passing any change notification up to the root node produces a system with greater flexibility and utility than conventional comparison tools. Advantageously, less time is spent reviewing the merged result, which contains only the relevant changes according to a user's needs. By providing an API, the system can be plugged into any application compatible with an object-oriented programming language, providing greater flexibility than conventional document comparison tools. By being object oriented, less time and computer resources are needed because there is no need to convert XML objects to flat, or text, files in order to perform a comparison process. Overall, the time and costs associated with document comparison are greatly reduced.

BRIEF DESCRIPTION OF THE DRAWINGS

The present invention will be more readily understood from the detailed description of the preferred embodiment(s) presented below considered in conjunction with the attached drawings, of which:

FIG. 3 presents examples of XML documents to be compared;

FIG. 7 presents an example of a result XML object according to an embodiment of the present invention.

DETAILED DESCRIPTION OF A PREFERRED EMBODIMENT

Figure 1:
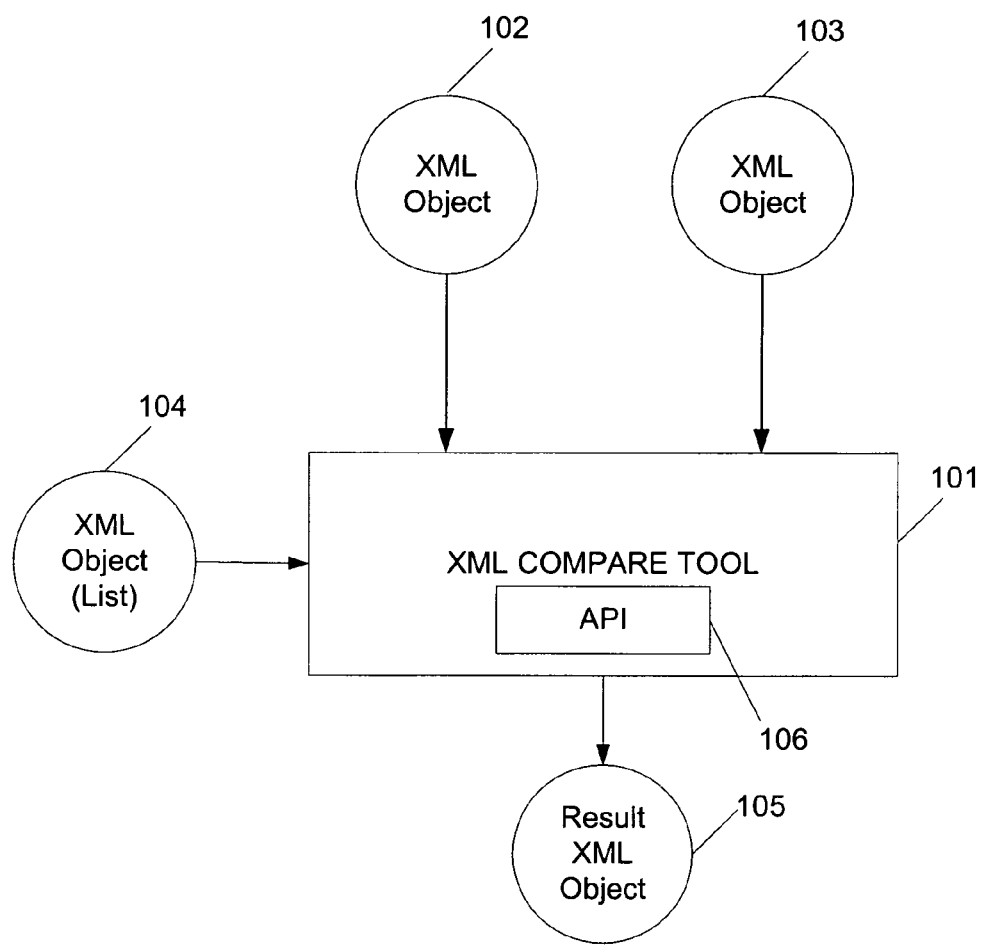
FIG. 1 illustrates a system according to an embodiment of the present invention.

FIG. 1 illustrates a system for comparing XML documents, according to a preferred embodiment of the present invention. The system includes an XML compare tool 101, which is created or written in an object-oriented programming language (OOPL), such as JAVA. The compare tool 101 includes an application program interface (API) 106, which allows the compare tool 101 to interface with any application compatible with the OOPL. The compare tool 101 receives XML documents in the form of objects, such as a DOM object. Thus, the compare tool 101 may receive a first XML object 102 and a second XML object 103, which represent two XML documents submitted for comparison. The compare tool 101 may also receive a third XML object 104, which represents a list of document items, or XML items, to be excluded from the comparison process. Alternatively, the third XML object 104 may also represent an inclusion list of XML items which is used when a user wishes to compare only those listed XML items between the first XML object 102 and the second XML object 103.

The compare tool 101 generates a processed result, such as a Result XML object 105, which is a merged result of the first XML object 102 and the second XML object 103. The compare tool 101 may transmit the Result XML object 105 to a destination in accordance with instructions from an application the compare tool 101 is working with.

Because the compare tool 101 includes an API 106, this single tool is not limited to interfacing with only one application, but may be plugged into any application compatible with the OOPL. A program administrator or a system developer may incorporate the compare tool 101 into a desired application, and by programming the application to convert its documents or files into XML objects, the application may transmit to and receive from the compare tool 101 relevant documents for comparison. Accordingly, it is up to the program administrator to determine just how an application manipulates the Result XML object 105 once received from the compare tool 101. Software components exist in the art that provide a means for transforming a document into an XML object, and one of ordinary skill will appreciate that the scope of the invention is not meant to be limited to any one means.

By processing documents in object form as opposed to flat files the compare tool 101 may compare documents from multiple sources and in different types, such as a text file, a spreadsheet, or a pictorial presentation, such as a PowerPoint™ presentation. Advantageously, the compare tool 101 uses fewer resources by being object oriented, because the relevant XML objects may be received from and transmitted to multiple applications without having to be converted to flat files or to their original form in order to be manipulated. The documents remain as XML objects throughout the comparison process.

Figure 2:
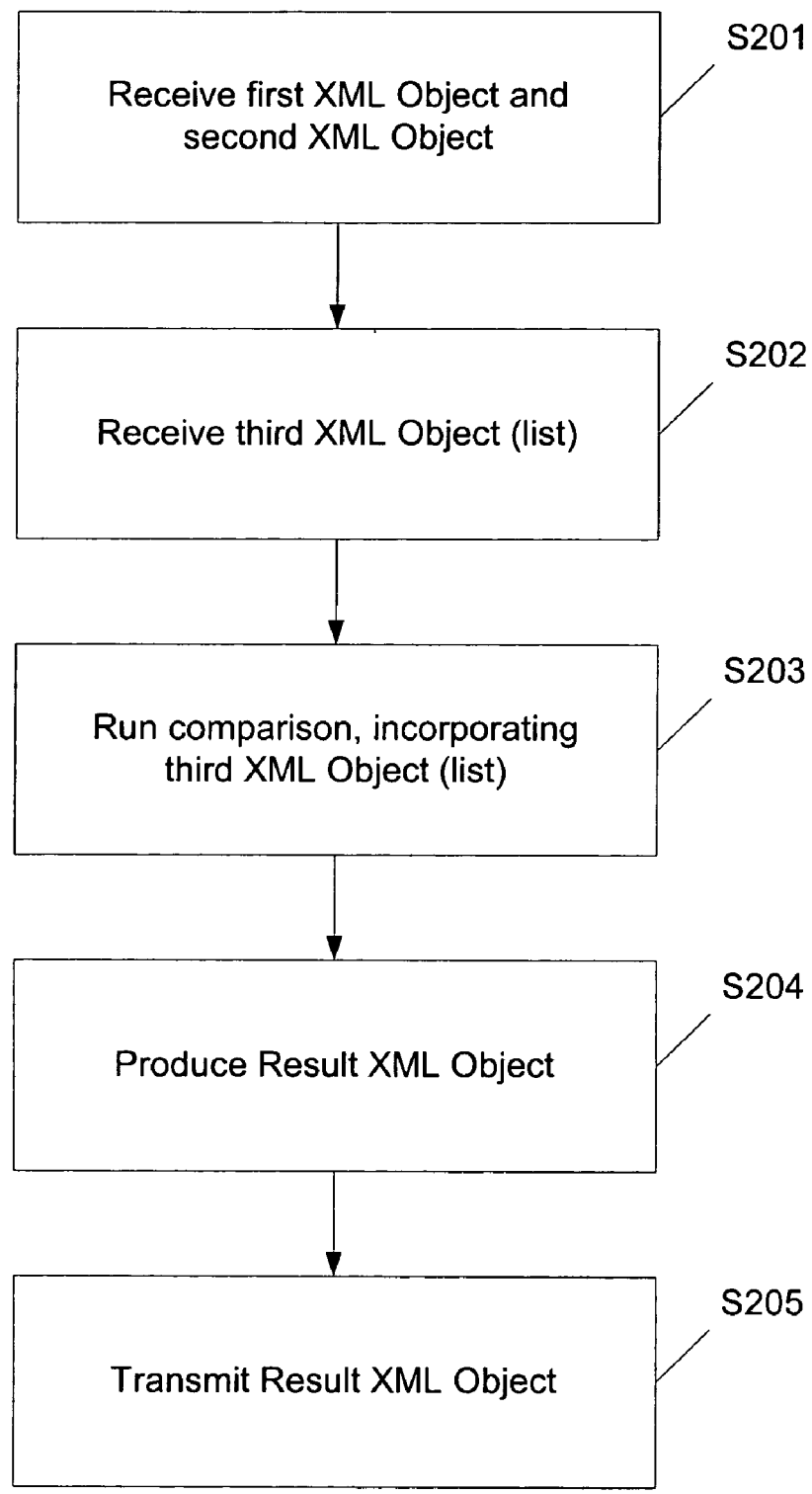
FIG. 2 is a flow chart describing a processing flow of a method for comparing XML documents according to an embodiment of the present invention.

FIG. 2 illustrates a method for comparing XML documents according to a preferred embodiment of the present invention. The steps of the method need not be taken in the sequence illustrated, and some steps may be implemented essentially simultaneously. At step S201, the compare tool 101 receives a first XML object 102 and a second XML object 103 from an application, where logically the first received XML object 102 is to be compared against the second received XML object 103. Elements and attributes present in the first XML object 102 that are not present in the second XML object 103 are considered by the compare tool 101 to be new elements and attributes added to the first XML object 102. Elements and attributes present in the second XML object 103 but not present in the first XML object 102 are considered to be elements and attributes deleted from the first XML object 102. Changes between corresponding elements and attributes in the first XML object 102 and the second XML object 103 are considered by the compare tool 101 to be modifications.

At step S202, the compare tool 101 receives a list 104 of elements and attributes to be excluded (exclusion list) from the comparison process, represented as a third XML object. During the comparison process, the compare tool 101 ignores changes in the elements and attributes specified in the exclusion list 104. However, the compare tool 101 passes the excluded elements and attributes and their data to a Result XML object 105 so that no document content is left out of the processed result. Upon receipt of the first XML object 102, the second XML object 103, and the exclusion list 104, the compare tool 101 is ready to perform the comparison process.

At step S203, the compare tool 101 opens the exclusion list 104 and stores the elements and attributes to be excluded in a computer-readable memory. The compare tool 101 then begins to traverse a tree structure of the first XML object 102 from the root node down to the lowest child node along a single path, or branch. The compare tool 101 then locates a corresponding root node in the second XML object 103 and traverses the structure of the second XML object 103 from the corresponding root node down to the lowest child node along a path corresponding to the path identified and traversed in the first XML object 102. The compare tool 101 compares each node along the path in the first XML object 102 with each node along the corresponding path in the second XML object 103. The compare tool 101 then traverses back up from the lowest child node to the most immediate parent node and then down to the next lowest child node and repeats this process until all nodes within both the first XML object 102 and the second XML object 103 have been traversed. An example of the compare tool 101 traversing an XML object according to a preferred embodiment of the present invention is discussed below in connection with FIG. 5.

As the compare tool 101 traverses both the first XML object 102 and the second XML object 103, at step S203, the compare tool 101 generates the Result XML object 105 and stores results of the comparison in the Result XML object 105, at step S204. As discussed above, the Result XML object 105 is a merged result of the first XML object 102 and the second XML object 103 and, thus, contains a superset of the elements and attributes of both the first and the second XML objects, 102 and 103. When a change to an element or attribute in a node along the path being traversed is identified, the compare tool 101 annotates the change in the corresponding node in the Result XML object 105. The compare tool 101 also annotates the change in the node in each parent node ascending from the particular node, all the way back to the root node. Thus, an application may review the root node of the Result XML object 105 to determine whether any changes exist between the first XML object 102 and the second XML object 103 as opposed to searching the entire Result XML object 105.

The compare tool 101 identifies a change between corresponding nodes in the XML objects 102 and 103 as "modified." The term "modified" is placed into the corresponding location in the Result XML object 105, at step S204. If the compare tool 101 determines that a new element and/or attribute has been added to the first XML object 102 as compared to the second XML object 103, the addition is identified as "inserted" in the corresponding location in the Result XML object 105. If the compare tool 101 determines that an element or attribute which exists in the second XML object 103 is not present in the first XML object 102, the compare tool 101 recognizes that the element or attribute has been deleted and identifies the deletion as "deleted" in the corresponding location in the Result XML object 105. Accordingly, if the compare tool 101 determines that there is no change between corresponding elements and attributes in the first XML object 102 and the second XML object 103, the corresponding location in the Result XML object 105 is annotated as "unchanged." An example of a Result XML object 105 according to the preferred embodiment is discussed in greater detail below in connection with FIGS. 6 and 7.

Once the compare tool 101 completes the comparison process, at step S203, and generates the Result XML object 105, at step S204, the compare tool 101 may transmit the Result XML object 105, at step S205, in accordance with the application interfacing with the compare tool 101. It is up to a program administrator to determine how the application should use the processed result from the compare tool 101. The compare tool 101 then is ready to perform another comparison.

Figure 4:
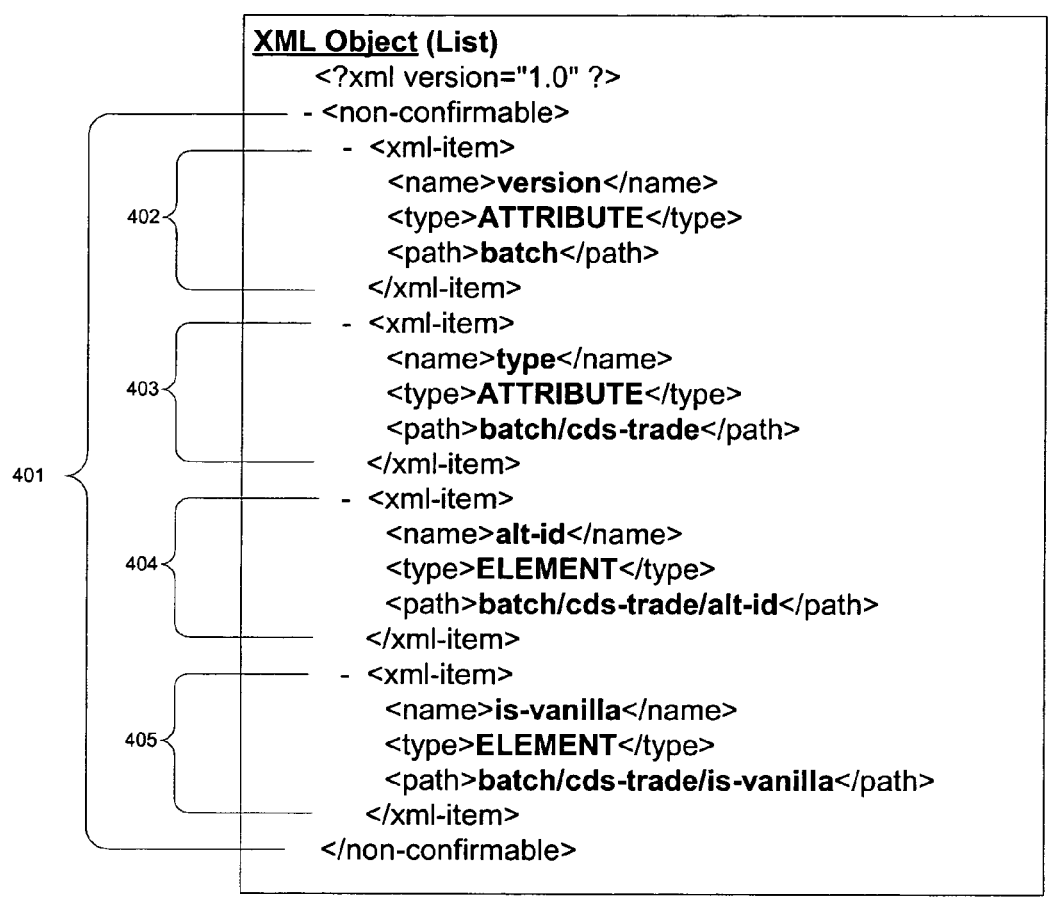
FIG. 4 presents an example of a list of XML items to be excluded from a comparison process.

FIGS. 3 and 4 illustrate a hierarchical structure, in programming language, of an XML object, similar to the first XML object 102, the second XML object 103, and the exclusion list 104. FIG. 7 illustrates a hierarchical structure, in programming language, of a processed result generated from the compare tool 101, similar to the Result XML object 105.

In FIG. 3, an XML object 301 includes a root element, batch 303, with an attribute "version" and an attribute value of "2.2." The batch 303 has two child elements: cds-trade 304, which has an attribute "type" and an attribute value of "trade," and status 309, which has an element value of "matured." The cds-trade 304 has four child elements: primary-id 305, alt-id 306, is-what-if 307, and is-vanilla 308. The primary-id 305 has an element value "558650" and an attribute "type" with an attribute value of "m3." The alt-id 306 has an element value of "60170" and an attribute "type" with an attribute value of "internal." The is-what-if 307 has an element value of "false," and the is-vanilla 308 has an element value of "false" also.

Similar to the XML object 301, an XML object 302 includes a root element, batch 310, with an attribute "version" and an attribute value of "2.3" (similar to the batch 303 in the XML object 301). The batch 310 has two child elements: cds-trade 311, which has an attribute "type" and an attribute value of "trade" (similar to the cds-trade 304 in the XML object 301) and version 316, which has an element value of "2.0." Similar to the XML object 301, the cds-trade 311 has four child elements: primary-id 312, alt-id 313, is-what-if 314, and is-vanilla 315. The primary-id 312 has an element value "550789" and an attribute "type" with an attribute value of "m3." The alt-id 313 has an element value of "52583" and an attribute "type" with an attribute value of "internal." The is-what-if 314 has an element value of "false," and the is-vanilla 315 has an element value of "true."

Although the examples presented in FIGS. 3 and 4 specify the XML version as "1.0," one of ordinary skill will understand that the present invention is not limited to this specific version of XML, but may be adapted to all existing and future versions as they are developed and improved upon.

In FIG. 4, an exclusion list XML object 400 is provided for the compare tool 101. The root element of the exclusion list 400 is non-confirmable 401. All child nodes descending from the root element non-confirmable 401 are XML items to be excluded from the comparison process. Each node corresponds to one XML item and includes the following information: the name of the item, the type of the item, whether it is an element or an attribute, and the path of the item, which gives its location within the hierarchy of the XML object 301, 302.

In FIG. 4, the exclusion list 400 excludes the XML items: batch version 402, cds-trade type 403, alt-id 404, and if-vanilla 405 from the comparison process. These excluded XML items correspond to the attributes of: the batch versions 303 and 310, and the cds-trade types 304 and 311; and the elements of: the alt-ids 306 and 313, and the if-vanillas 308 and 315 in XML objects 301 and 302, respectively.

As stated above, an XML item to be excluded is described by a name, a type and a path. The compare tool 101 interprets the excluded XML item 402 to mean that an attribute named "version," which is located in the node "batch," and an attribute value associated with this attribute are to be ignored during the comparison process. Similarly, the compare tool 101 interprets the exclusion XML item 403 to mean that an attribute named "type," which is located in the node "batch/cds-trade," and an attribute value associated with this attribute are to be ignored during the comparison process. The compare tool 101 interprets the exclusion XML items 404 and 405 to mean that an element named "alt-id" located in the node "batch/cds-trade/alt-id" and an element named "if-vanilla," which is located in the node "batch/cds-trade/alt-id," and their respective element values are to be ignored during the comparison process.

The compare tool 101 follows the exclusion rules displayed in Table 1, below:

TABLE 1

|  | First XML Object | Second XML Object | Result XML Object |
| --- | --- | --- | --- |
| New Item | X | — | X |
| Changed Item | X | Y | X |
| Deleted Item | — | Y | — |

Thus, if an item is to be excluded for the Result XML object 105, if the item exists in the first XML object 102 but not the second XML object 103, the compare tool 101 applies the top rule "New Item" and creates a corresponding item in the Result XML object 105. The compare tool 101 then passes the data associated with the new item from the first XML object 102 to the corresponding item in the Result XML object 105, and annotates the item in the Result XML object 105 as "unchanged." If an excluded item exists in the second XML object 103 but not the first XML object 102, the compare tool 101 applies the bottom rule "Deleted Item" and creates a corresponding item in the Result XML object 105, but passes no item data to the item in the Result XML object 105. However, if an excluded item has been modified from the second XML object 103 to the first XML object 102, the compare tool 101 applies the middle rule "Changed Item" and creates a corresponding item in the Result XML object 105. Similar to the rule "New Item," the compare tool 101 passes the item and its associated data from the first XML object 102 and annotates the item as "unchanged" even though the item actually has changed between the first XML object 102 and the second XML object 103. Thus, the exclusion list 104 allows a user to ignore irrelevant changes between documents and focus on the changes that are relevant.

Figure 5:
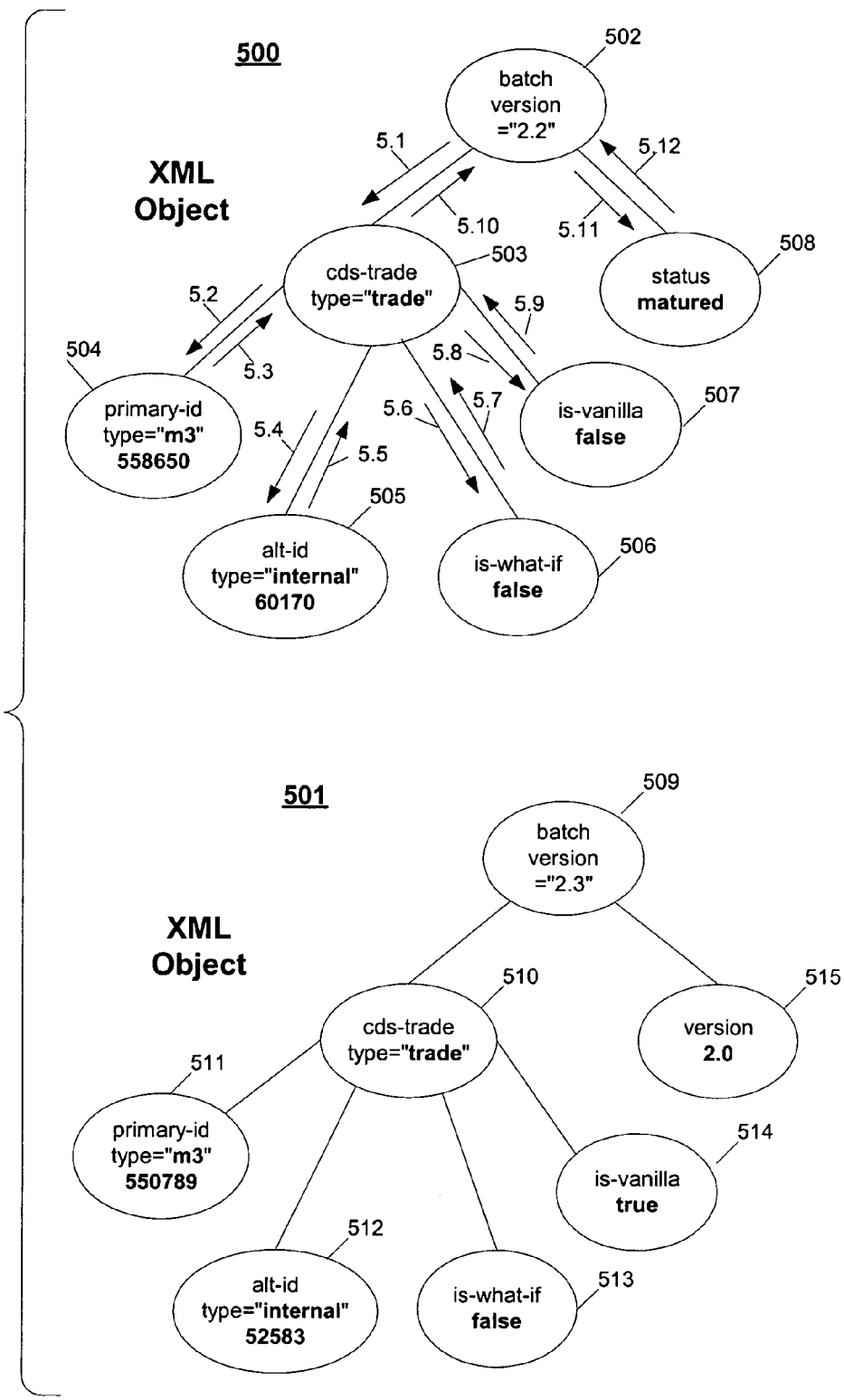
FIG. 5 illustrates how a system according to an embodiment of the present invention performs a comparison process between two XML objects.

FIG. 5 illustrates the comparison process as performed on a hierarchical or "tree" structure of an XML object. Accordingly, an XML object 500 and an XML object 501 correspond to the XML objects 301 and 302, respectively. Thus, nodes 502 through 508 in the XML object 500 correspond to the elements and attributes 303 through 309, respectively, in the XML object 301 in FIG. 3. Similarly, nodes 509 through 515 in the XML object 501 correspond to the elements and attributes 310 through 316, respectively, in the XML object 302 in FIG. 3.

As discussed above, the root element, or root node, of both the XML objects 500 and 501 are the batch nodes 501 and 509, respectively. In the XML object 500, the batch node 502 has two child nodes, cds-trade 503 and status 508. The status 508 has no child nodes. However, the cds-trade 503 has four child nodes: primary-id 504, alt-id 505, is-what-if 506, and is-vanilla 507. The data associated with each node is displayed accordingly. Similarly, in the XML object 501, the batch node 509 has two child nodes: cds-trade 510 and version 515. The version 515 has no child nodes. However, the cds-trade 510 has four child nodes: primary-id 511, alt-id 512, is-what-if 513, and is-vanilla 514.

Figure 6:
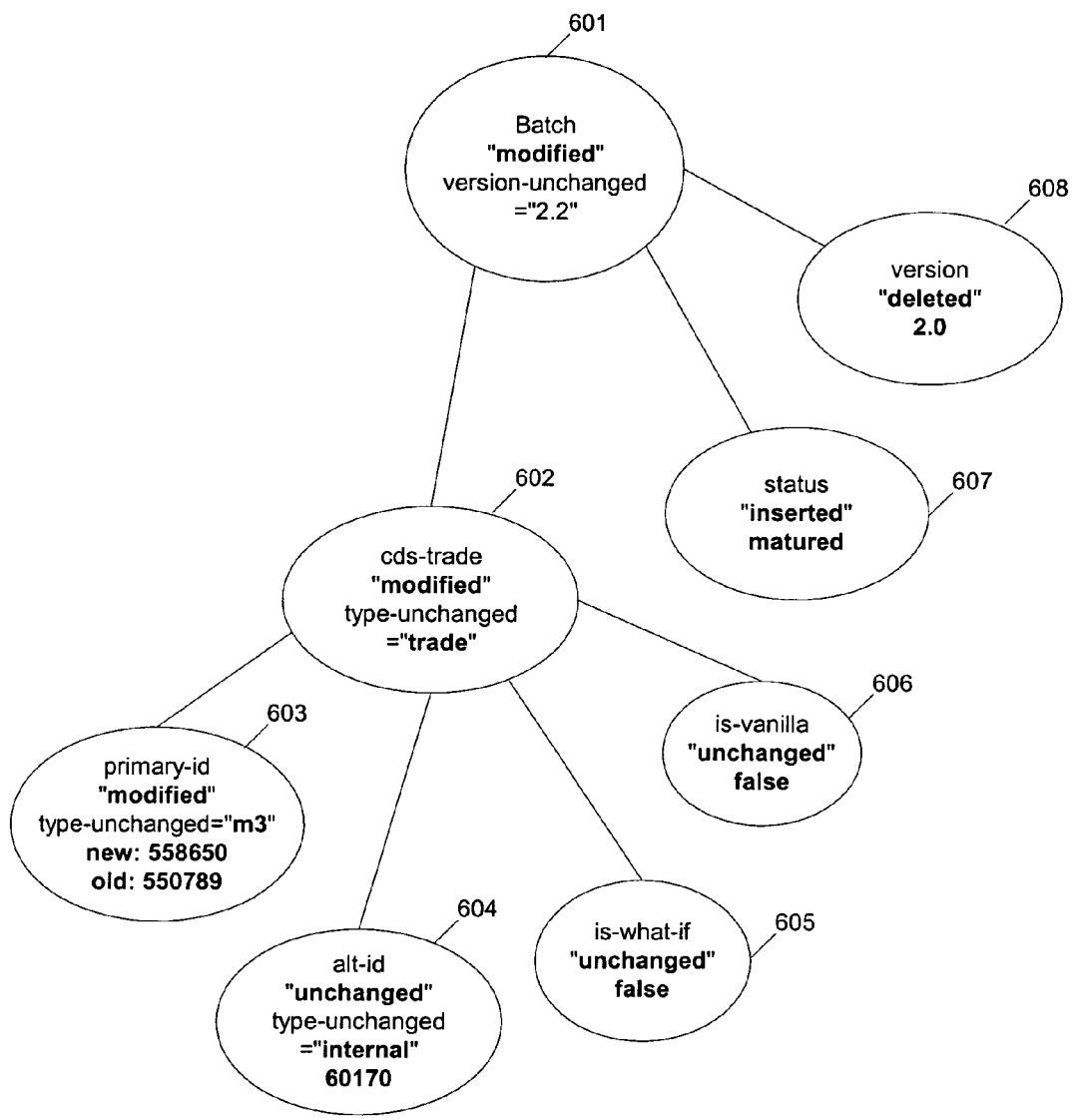
FIG. 6 illustrates a structure of a result generated from a comparison process according to an embodiment of the present invention.

In FIG. 5, arrows 5.1 through 5.12 illustrate the logic the compare tool 101 follows as it traverses the XML objects during the comparison process in accordance with a preferred embodiment of the present invention. As mentioned above, when the compare tool 101 traverses the first XML object, in this case, the XML object 500, the compare tool 101 begins at the root node, the batch node 502, and searches the second XML object, in this case, the XML object 501, for a root node. The compare tool 101 determines that the batch node 509 is the root node of the XML object 501. Simultaneously, the compare tool 101 begins to generate a Result XML object 600, as shown in FIG. 6, and creates a root node 601. The compare tool 101 determines that both root nodes, i.e., the batch nodes 502 and 509 contain a single attribute "version" and an attribute value.

In a straight comparison, the compare tool 101 compares the batch node 502 with the batch node 509 and determines that there has been a change from the XML object 501 to the XML object 500 in that the attribute value "2.3" has changed to "2.2." Within the root node 601, the compare tool 101 indicates that a change has occurred by using the annotation "modified." The compare tool 101 then carries the node data from the first XML object, i.e., the XML object 500, and assigns it to the root node, the batch node 601, as indicated by the "2.2" in the batch node 601. Again, this is what occurs with a straight comparison where no exclusion list is involved.

However, by applying the exclusion list 400 of FIG. 4, the compare tool 101 recognizes that the attribute "version" in a node "batch" is to be ignored during the comparison process, as shown at 402. In accordance with the exclusion rules in Table 1, the compare tool 101 ignores the change in version numbers, generates a "batch" node 601 in the Result XML object 600, and passes the node data from the XML object 500, i.e., "version=2.2." The compare tool 101 also annotates the batch node 601 as "unchanged." However, this annotation may change as the comparison process progresses.

The compare tool 101 then traverses along a path 5.1 from the root node, i.e., the batch 502, to the first descending child node, i.e., the cds-trade node 503, in the XML object 500. The compare tool 101 then traverses the XML object 501 along a path similar to 5.1 from the root node, i.e., the batch node 509, to the first descending child node, which happens to be the cds-trade node 510. The compare tool 101 determines that the cds-trade nodes 503 and 510 contain an attribute "type" with the same attribute value "Trade." The compare tool 101 creates a cds-trade node 602 in the Result XML object 600. In a straight comparison, the compare tool 101 would annotate the cds-trade node 602 in the Result XML object 600 as "unchanged" and pass the attribute value "Trade" to the cds-trade node 602. However, with the exclusion list 400, the compare tool 101 recognizes that an attribute "type" in a node "cds-trade" is to be ignored during the comparison process, as shown at 403. The end result is the same: the compare tool 101 annotates the cds-trade node 602 as "unchanged" and passes the attribute value from the first XML object, i.e., the XML object 500, which is "trade," in accordance with the exclusion rules in Table 1. Although there is no change between the cds-trade node 503 in the XML object 500 and the cds-trade node 510 in the XML object 501, if there had been a change, the compare tool 101 would have ignored it.

The compare tool 101 then determines that the cds-trade nodes 503, 510 are not the lowest child node descending from the root node, i.e., the batch nodes 502, 509. Thus, the compare tool 101 traverses along a path 5.2 from the cds-trade node 503 in the XML object 500 to a descending child node, if one exists. In the XML object 500, a child node descending from the cds-trade node 503 is the primary-id node 504. The compare tool 101 traverses a path similar to 5.2 from the cds-trade node 510 in the XML object 501 and locates the first descending child node, i.e., the primary-id node 511. The compare tool 101 reviews the exclusion list 400 and determines that neither elements nor attributes associated with a "primary-id" node are to be excluded from the comparison process. Thus, the compare tool 101 compares the elements and attributes of the primary-id nodes 504 and 511 and determines that both nodes contain an element with an element value, and an attribute "type" with an attribute value. The compare tool 101 determines that although there has been no change between the attribute and the attribute values in the primary-id nodes 504 and 511, the element value has changed from "550789" in the primary-id node 511 to "558650" in the primary-id node 504. The compare tool 101 creates a primary-id node 603 in the Result XML object 600 at a corresponding location, and annotates the primary-id node 603 as "modified." The compare tool 101 passes data associated with the unchanged attribute as indicated by the line "type-unchanged='m3,'" and passes both the new element value "558650" from the XML object 500, and the old element value "550789" from the XML object 501. The compare tool 101 then begins to search for any child nodes descending from the primary-id nodes 504 and 511, in the XML objects 500 and 501, respectively.

In FIG. 5, the compare tool 101 determines that both the primary-id node 504 and the primary-id node 511 are the lowest child nodes along that path 5.2 in both the XML objects 500 and 501, respectively. The compare tool 101, therefore, traverses back up the path from the primary-id nodes 504, 511 to the immediate parent node, i.e., the cds-trade nodes 503, 510, as shown at 5.3. As discussed above, changes made in the child nodes are percolated back up the path to the root node. Thus, the compare tool 101 annotates the cds-trade node 602 in the Result XML object to reflect the change to the element value between the cds-trade nodes 503 and 510. In the cds-trade node 602, the compare tool 101 reflects the change made in the child primary-id nodes 503 and 510 by changing the annotation from "unchanged" to "modified." However, the elements and attributes associated with the cds-trade node 602 remain unchanged.

The compare tool 101 then traverses along a path 5.4 to determine if the cds-trade nodes 503, 510 have additional child nodes, in the XML objects 500, 501. Upon doing so, the compare tool 101 locates the next child node, which are the alt-id nodes 505, 512 in the XML objects 500, 501, respectively, and determines that the alt-id nodes 505, 512 contain an element value, an attribute "internal," and an attribute value. The compare tool 101 then reviews the exclusion list 400 and determines that an element in a "alt-id" node is to be ignored during the comparison process, as shown at 404. Thus, the compare tool 101 ignores the change in the element value from "52583" in the alt-id node 512 to "60170" in the alt-id node 505. The compare tool 101, however, compares the attribute "type" and attribute value in both the alt-id nodes 505 and 512, and determines that no change has occurred. The compare tool 101 creates an alt-id node 604 in the Result XML object 600 at the proper location, and annotates the alt-id node 604 in the Result XML object 600 as "unchanged." The compare tool 101 passes the element and attribute data from the alt-id node 505 in the XML object 500 to the alt-id node 604 in the Result XML object 600, in accordance with the exclusion rules in Table 1.

The compare tool 101 next determines that the alt-id nodes 505, 512 in both the XML objects 500 and 501 are the lowest child nodes along the path 5.4, and traverses the XML objects 500 and 501 along a path 5.5 back up to the immediate parent node, i.e., the cds-trade nodes 503, 510. The compare tool 101 then traverses the XML objects 500 and 501 to search for other child nodes descending from the cds-trade nodes 503, 510. In both the XML objects 500 and 501, the next child nodes descending from the cds-trade nodes 503, 510 are the is-what-if nodes 506, 513 along a path 5.6. The compare tool 101 determines that the is-what-if nodes 506, 513 each contain a single element value. The compare tool 101 then reviews the exclusion list 400 and determines that an "is-what-if" node is not listed as an excluded XML item. Thus, the compare tool 101 compares the element value "false" of the is-what-if node 506 in the XML object 500 to the element value "false" of the is-what-if node 513 in the XML object 501, and determines that no change has occurred. Accordingly, the compare tool 101 creates an is-what-if node 605 in the Result XML object 600 at the proper location, and annotates the is-what-if node 605 in the Result XML object 600 as "unchanged." The compare tool 101 then passes the element value "false" to the is-what-if node 605.

The compare tool 101 next determines that the is-what-if nodes 506, 513 in the XML objects 500, 501, respectively, are the lowest child nodes along the path 5.6, and traverses the XML objects 500 and 501 along a path 5.7 back up to the immediate parent nodes, i.e., the cds-trade nodes 503, 510. The compare tool 101 then traverses the XML objects 500, 501 to search for other child nodes descending from the cds-trade nodes 503, 510. In both the XML objects 500 and 501, the next child nodes descending from the cds-trade nodes 503, 510 are the is-vanilla nodes 507, 514 along a path 5.8. The compare tool 101 determines that the is-vanilla nodes 507, 514 each contain a single element value. The compare tool 101 then reviews the exclusion list 400 and determines that an element value of an "is-vanilla" node is to be excluded from the comparison process, as shown at 405. Thus, the compare tool 101 ignores the fact that the element value of the if-vanilla nodes 506, 513 has changed from "true" in the XML object 501 to "false" in the XML object 500. The compare tool 101 creates an is-vanilla node 606 in the Result XML object 600 at the proper location, and annotates the if-vanilla node 606 in the Result XML object 600 as "unchanged." The compare tool 101 passes the element value "false" from the XML object 500, in accordance with the exclusion rules in Table 1.

The compare tool 101 next determines that the is-vanilla nodes 507, 514 in both the XML objects 500 and 501 are the lowest child nodes along the path 5.8, and traverses the XML objects 500 and 501 along a path 5.9 back up to the immediate parent nodes, the cds-trade nodes 503, 510. The compare tool 101 then traverses the XML objects 500, 501 to search for other child nodes descending from the cds-trade nodes 503, 510. In both the XML objects 500 and 501, no other child nodes descend from the cds-trade nodes 503, 510, and, thus, the compare tool 101 traverses along a path 5.10 back up to the root nodes, i.e., the batch node 502, 509. As discussed above, any changes made in child nodes descending from a parent node percolate up to the parent node. Thus, the change determined in the primary-id nodes 504, 511, which percolated to the cds-trade nodes 503, 510, now percolates to the root nodes, the batch nodes 502, 509. The compare tool 101 alters the annotation "unchanged" in the batch node 601 in the Result XML object 600 to "modified" to indicate the change. No other data within the batch node 600 changes, thus, an application viewing the Result XML object 600 recognizes that a modification has occurred in a child node descending from the root nodes, i.e., the batch nodes 502, 509.

The compare tool 101 then traverses the XML objects 500 and 501 to search for other child nodes descending from the batch nodes 502, 509. In the XML object 500, the compare tool 101 locates a child node, the status node 508, along a path 5.11 and determines that the status node 508 contains an element value "matured." However, when the compare tool 101 traverses a similar path to 5.11, the compare tool 101 locates a child node, the version node 515, but no child node corresponding to the status node 508. The compare tool reviews the exclusion list 400 and determines that both the status node 508 and the version node 515 are to be included in the comparison process. The compare tool 101 creates a status node 607 and a version node 608 in the Result XML object 600. The compare tool then annotates the status node 607 as "inserted" and the version node 608 as "deleted" in the Result XML object 600.

In accordance with the exclusion rules in Table 1, if the exclusion list 400 lists the version node 515 as an XML item to be excluded from the comparison process, the compare tool 101 would have created a version node 607 in the Result XML object 600, but would not pass the element value "2.0," because this information is irrelevant to the user. However, because the version node 515 is included in the comparison process, the compare tool 101 passes the element value "2.0" to the version node 608 in the Result XML object 600.

At this point, the compare tool 101 traverses the XML objects 500, 501 to determine if child nodes descend from either the status node 508 or the version node 515. The compare tool 101 determines that both the status node 508 and the version node 515 are the lowest child nodes along the path 5.11 and traverses along a path 5.12 back up to the immediate parent nodes, i.e., the batch nodes 502, 509. The compare tool 101 then traverses the XML objects 500, 501 to determine if other child nodes descend from the batch nodes 502, 509 and finds none. Thus, the compare tool 101 determines that the no other nodes exist to process, and terminates the comparison process. The compare tool 101 prepares the Result XML object 600 for transmitting to one or more locations as instructed by the application interacting with the compare tool 101, and transmits the Result XML object 600 accordingly.

FIG. 7 illustrates the processed result, i.e., the Result XML object 600, in a flat file format referred to as a Flat Result XML object 700. In the Flat Result XML object 700, XML items 701 through 708 correspond to the nodes 601 through 608, respectively. Thus, the Flat Result XML object 700 is a complete merge of the two XML documents submitted for comparison, and all elements and attributes from the XML object 500 and the XML object 501 are produced in the Flat Result XML object 600, regardless of whether an element and/or attribute were excluded from the comparison process. No content is lost between the two compared XML documents.

As discussed above, an alternate embodiment of the present invention includes a compare tool receiving a first XML object, a second XML object, and a third XML object representing an inclusion list of items to limit the comparison process to. This feature is useful when a user wants to determine whether only a few changes have occurred between two XML documents. Rather than produce an extensive exclusion list, the compare tool may accept a list of items such that the compare tool processes only those items and no other content within the XML documents. The comparison process utilizing the inclusion list follows the same steps shown in FIG. 2, and produces a processed Result XML object similar to that shown in FIGS. 6 and 7.

As will be appreciated, many different types of applications can utilize the features of the present invention. The inventive method may also be embodied on computer-executable code that is stored on a computer-readable medium, for example, a floppy disk, a hard drive, removable media, an optical memory, a magneto-optical memory, a RAM, a ROM, a flash memory, so-called "memory sticks," and the like.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A computer-implemented method for comparing XML documents, comprising the steps of:

receiving a first XML object corresponding to a first document and a second XML object corresponding to a second document;

receiving a third XML object, wherein the third XML object includes a list of one or more XML items from the first XML object, the second XML object, or both the first and the second XML objects, the third XML object being an exclusion list of XML items, an XML item to be excluded being described by a name, a type, and a path;

comparing content of the first XML object with content of the second XML object, wherein the one or more XML items of the third XML object is excluded from the step of comparing, and wherein the step of comparing includes finding differences in content; and generating a result XML object from the results of the step of comparing, the result XML object including an item from the first XML object if the item appears in the first XML object but not the second XML object, the result XML object including an item from the first XML object in the result XML object if the item appears in the first XML object and a second different item appears in the second XML object, and the result XML object not including an item from the second XML object if the item appears in the second XML object but not the first XML object;

wherein the first XML object, the second XML object, and the third XML object are formatted according to a Document Object Model representation.

2. A computer-implemented method according to claim 1, wherein at least one of the first XML object and the second XML object is based on a text document, a graphics document, an image document, a spreadsheet, a database record, a Web page, a pictorial presentation, or a combination thereof.

3. A computer-implemented method according to claim 1, wherein contents of the first XML object, the second XML object, and the third XML object have a hierarchical structure comprising a root node and one or more child nodes descending from the root node.

4. A computer-implemented method according to claim 3, wherein the root node and the one or more child nodes each comprise one or more elements, one or more attributes, or at least one element and at least one attribute.

5. A computer-implemented method according to claim 3, wherein the step of comparing includes the step of traversing the first XML object and the second XML object according to a depth-first algorithm, and wherein at each traversal to subsequent nodes in the search, the contents of each node in the first XML object are compared with contents of a corresponding node in the second XML object before proceeding to the next pair of nodes in the traversal.

6. A computer-implemented method according to claim 3, wherein a change in the content of a node of the first XML object compared with a content of a corresponding node of the second XML object is identified as "modified" in the result XML object.

7. A computer-implemented method according to claim 3, wherein a node appearing in the first XML object but not in the second XML object is identified as "inserted" in the result XML object.

8. A computer-implemented method according to claim 3, wherein a node appearing in the second XML object but not in the first XML object is identified as "deleted" in the result XML object.

9. A computer-implemented method according to claim 3, wherein no change in contents of corresponding nodes between the first XML object and the second XML object is identified as "unchanged" in the result XML object.

10. A computer-implemented method according to claim 1, wherein XML items corresponding to the one or more XML items of the third XML object are identified as "unchanged" in the result XML object.

11. A computer-implemented method according to claim 1, further comprising the step of passing content of an XML item corresponding to the one or more XML items from the first XML object to the result XML object.

12. A computer-implemented method according to claim 1, wherein the one or more XML items each comprises a name of an element or attribute to be excluded from the comparing steps an item type, and a path indicating a location of an XML item to be excluded within either the first XML object, the second XML object, or both.

13. A computer-implemented method according to claim 1, wherein the result XML object comprises a merged result of the first XML object and the second XML object.

14. A computer-readable storage medium storing computer code for implementing a method of comparing XML documents, wherein the computer code comprises:
    code for a first reception step of receiving a first XML object corresponding to a first document and a second XML object corresponding to a second document;
    code for a second reception step of receiving a third XML object, wherein the third XML object includes a list of one or more XML items from the first XML object, the second XML object, or both the first and the second XML objects, the third XML object being an exclusion list of XML items, an XML item to be excluded being described by a name, a type, and a path;
    code for a comparison step of comparing content of the first XML object with content of the second XML object, wherein the one or more XML items of the third XML object is excluded from the comparison step, and wherein the comparing step includes finding differences in content; and
    code for a result generation step of a result XML object from the results of the comparison step, the result XML object including an item from the first XML object if the item appears in the first XML object but not the second XML object, the result XML object including an item from the first XML object in the result XML object if the item appears in the first XML object and a second different item appears in the second XML object, and the result XML not including an item from the second XML object if the item appears in the second XML object but not the first XML object,
    wherein the first XML object, the second XML object, and the third XML object are formatted according to a Document Object Model representation.

15. A computer-implemented method for comparing XML documents, comprising the steps of:
    receiving a first XML object corresponding to a first document and a second XML object corresponding to a second document;
    receiving a third XML object, wherein the third XML object includes a list of one or more XML items from the first XML object, the second XML object, or both the first and the second XML objects, the third XML object being an exclusion list of XML items, an XML item to be excluded being described by a name, a type, and a path;
    comparing content of the first XML object with content of the second XML object, wherein the one or more XML items of the third XML object is excluded from the step of comparing, and wherein the step of comparing includes finding differences in content;
    generating a result XML object from the results of the step of comparing, the result XML object including an item from the first XML object if the item appears in the first XML object but not the second XML object, the result XML object including an item from the first XML object in the result XML object if the item appears in the first XML object and a second different item appears in the second XML object, and the result XML object not including an item from the second XML object if the item appears in the second XML object but not the first XML object; and
    providing an application programming interface to allow other computer implemented methods written in an object oriented programming language to interact with said steps for receiving a first, second, and third XML object, said step for comparing content of the first XML object with content of the second XML object and said step for generating a result XML object.

16. A computer-readable storage medium storing computer code for implementing a method of comparing XML documents, wherein the computer code comprises:
    code for a first reception step of receiving a first XML object corresponding to a first document and a second XML object corresponding to a second document;
    code for a second reception step of receiving a third XML object, wherein the third XML object includes a list of one or more XML items from the first XML object, the second XML object, or both the first and the second XML objects, the third XML object being an exclusion list of XML items, an XML item to be excluded being described by a name, a type, and a path;

code for a comparison step of comparing content of the first XML object with content of the second XML object, wherein the one or more XML items of the third XML object is excluded from the comparison step, and wherein the comparison step includes finding differences in content;

code for a result generation step of a result XML object from the results of the comparison step, the result XML object including an item from the first XML object if the item appears in the first XML object but not the second XML object, the result XML object including an item from the first XML object in the result XML object if the item appears in the first XML object and a second different item appears in the second XML object, and the result XML object not including an item from the second XML object if the item appears in the second XML object but not the first XML object; and code for providing an application programming interface to allow applications written in an object oriented programming language to interact with said code for implementing the first reception step of receiving a first XML object and a second XML object, the second reception step for receiving a third XML document, the comparing step for comparing content of the first XML object with content of the second XML object, and the result generation step for generating a result XML object.

* * * * *